Sept. 27, 1960   R. MacRAE   2,953,830
MOUNTING CLIPS
Filed Jan. 30, 1958
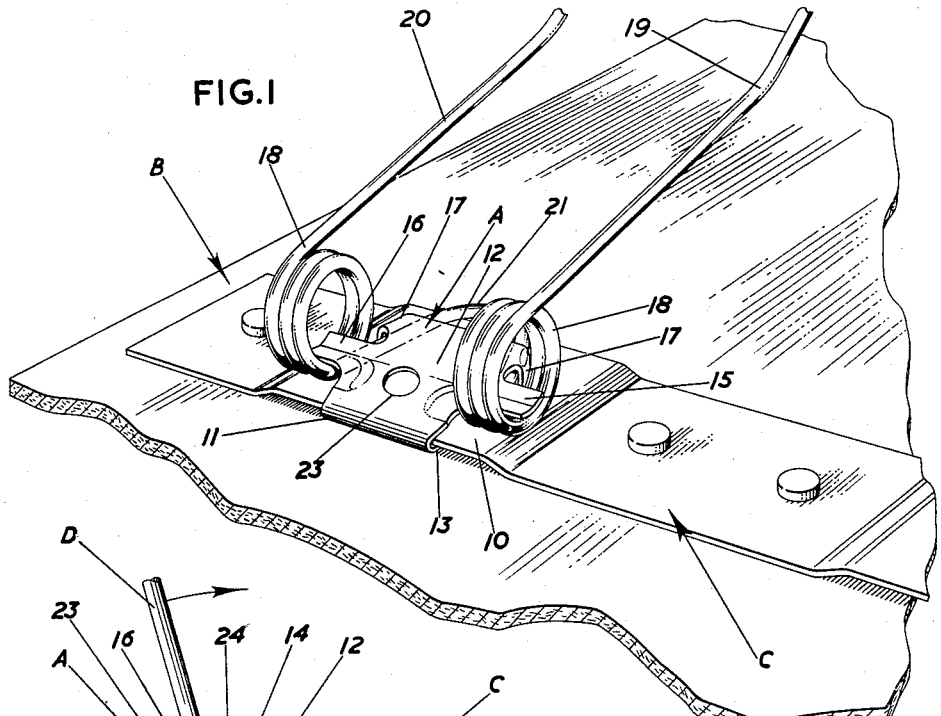
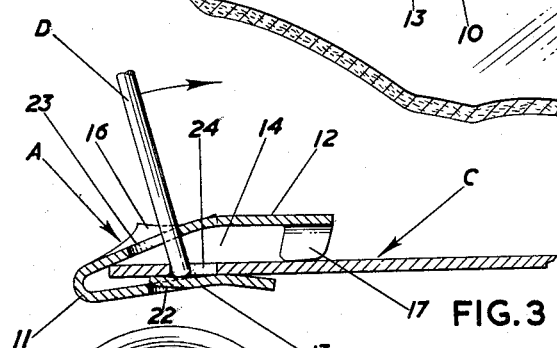
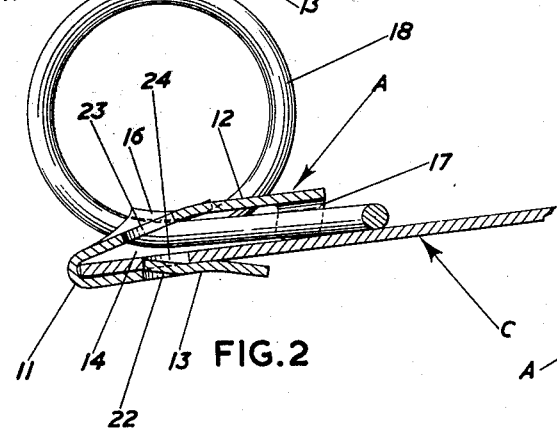
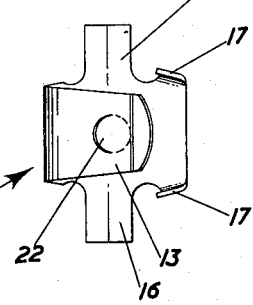
Inventor
RALPH MACRAE.
By~ Featherstonhaugh & Co.
Att'ys.

2,953,830

MOUNTING CLIPS

Ralph MacRae, Hamilton, Ontario, Canada, assignor, by mesne assignments, to George A. Tinnerman, Cleveland, Ohio Filed Jan. 30, 1958, Ser. No. 712,179

4 Claims. (Cl. 24—73)

This invention relates to mounting clips for mounting a member on a plate or the like.

The invention may aptly be illustrated in relation to a fastening of spring fingers to draper canvas employed on combine draper pick-ups, although the invention is not specifically limited thereto. Such spring fingers have in the past been secured by an armed bracket, by means of a toothed extension thereof, through which a bolt passes in order to clamp the bracket firmly in position on the canvas. Such means of attachment is complicated because it requires a number of operations to secure it, including locating the bolt relatively to the extension in position on the canvas and then securing the nut firmly in relation thereto to effect a solid union. Moreover, it involves a retainer combination including several parts so that in terms of complication involving time and effort and in terms of cost, such fasteners are disadvantageous.

The present invention overcomes disadvantages of prior practice by providing a unitary fastener which may be easily located in accurate position and locked in mounted position in a very simple operation.

The invention generally comprises a unitary mounting clip formed of a sheet metal body bent upon itself to provide complementary spaced apart gripping components having a receiving channel therebetween for a mounting member such as a plate or the like designed to be gripped by said components, said body having means for engaging and holding an independent element relatively to said mounting member; one of said components having a projection extending therefrom and directed towards said channel for locking said body on said mounting member, the other component having an orifice substantially in registry with said projection in the other component but offset in respect thereto and forming means for locating said body upon said mounting member and said projection in locking engagement therewith.

The invention will be clearly understood by reference to the following detailed specification taken in conjunction with the accompanying drawings.

In the drawings:

Fig. 1 is a perspective view of a mounting clip according to the present invention shown mounted on a strip plate and retaining flexible spring fingers in relation thereto.

Fig. 2 is a longitudinal section taken through the centre of the clip to illustrate is correlation in mounted position to the strip plate.

Fig. 3 is a sectional view taken through the clip and the mounting strip plate showing the clip being applied to the latter and showing the means whereby said clip is accurately and easily located on its mounting member; and Fig. 4 is a bottom plan view of the clip.

Referring to the drawings, A indicates the mounting clip according to the present invention which is illustrated in conjunction with the canvas conveyor B on a combine draper pick-up. The mounting element C which takes the form of a plate-like strip is secured to the canvas B and provided at intervals throughout its length with offset portions 10 to space the plate, in these areas, from the canvas B. The clip A is formed from sheet metal bent upon itself as at 11 to provide a body having complementary spaced apart gripping components 12 and 13 forming a receiving channel 14 therebetween for receiving the mounting member such as parts of the mounting strip C. The mounting members are preferably provided with orifices in relation to which the clip A is located and locked.

This sheet metal body is died to shape and in the present instance is provided with the laterally projecting arms 15 and 16 which are disposed in spaced relation to the mounting plate by means of lugs 17 which are bent substantially at right angles from the plane of component 12 and are designed to engage the outermost face of the mounting plate C. This, therefore, spaces the component 12 in its forward area away from the mounting plate C.

The specific form of clip described is designed for cooperation with a spring finger pick-up element 18 having the spring fingers 19 and 20 projecting from coiled portions of the element. These coils are united by a continuing portion of the element which is bent to form the U-shaped, centrally located forwardly projecting tongue 21. The arms 15 and 16, therefore, may be disposed to project into the coils of the fingers 19 and 20 and the tongue 21 to project below the component 12 between the lugs 17 so that it will rest below component 12 on the mounting plate C when the pick-up element 18 is mounted thereon.

Component 13 is formed with a tongue 22 which is struck therefrom to project slightly within the receiving channel 14 between both components and in a direction towards the bent portion of the clip. Component 12 is orificed as at 23 substantially in registry with the tongue 22 but offset slightly therefrom in a direction towards the bent portion of the clip. The tongue 22 is designed in the final mounted position of the clip to engage and lock within an orifice 24 on the mounting plate C.

The accurate mounting of the clip is a very easy matter. Assuming the clip to be of specific form for the purpose of mounting the spring finger pick-up described, the latter is first of all disposed on the clip in the manner above described and the complementary gripping components 12 and 13 of the clip are caused to straddle the mounting plate C whereupon by passing a rod D or other suitable element such as a screw driver through the orifice 23 in component 12 and into the orifice 24 of the mounting plate C until in engagement with the tongue 22 of component A, it is only necessary to fulcrum such element on the edge of orifice 24 and against the edge of orifice 23 to force the clip to move to final position transversely of the mounting plate C and, at the same time, to cause it to align with the orifice 24. This is achieved by slightly offsetting the orifice 23 in relation to the tongue 22 as above described. Consequently, as the clip is moved the slight remaining distance necessary to locate the tongue 22 accurately in this operation, the tongue 22 will in effect snap into orifice 24 of the mounting plate C and the whole unit is immediately locked on plate C.

While this mounting clip is particularly adaptable to the mounting of draper pick-up fingers as described, it is obvious that it may be otherwise formed to mount other elements in relation to a mounting plate or the like. Consequently it will be appreciated that the basis of the invention lies in a unitary clip having spaced apart complementary gripping elements as set forth in the appended claims, one formed with a projecting locking element and the other with an orifice located relatively to the locking element but offset slightly in relation thereto. It will be obvious also that the locking element need not necessarily be a tongue but could constitute an offset portion of the component in question formed to provide a shoulder which will effect the locking action, i.e. a shouldered boss. Thus, a suitable projection is necessary to effect locking action and it is intended that the term "shouldered boss" or "locking tongue" be interpreted in the broad sense in terms of a suitable projection.

What I claim as my invention is:

1. A mounting clip comprising a sheet metal body bent upon itself to form complementary spaced apart gripping components having a receiving channel therebetween for a mounting member to be gripped by said components, said body having means for engaging and holding an independent element relatively to said mounting member including means for spacing one of said components from said mounting member and against movement towards the latter thereby forming a receiving space therebetween for said independent element, one of said components having a projecting element, projecting into said receiving channel for locking said body on said mounting member, the other component having an orifice substantially in registry with said projecting element on the other component but offset in respect thereto in a direction towards the bend in said body and forming means for locating said body on said mounting member and said projecting element in locking engagement therewith, said projecting element forming a base for a locating tool passed through said orifice of said other component.

2. A mounting clip as claim in claim 1 in which the projecting element is a tongue struck from the said first mentioned component, forming a shoulder for engagement with the periphery of an orifice in said mounting member and providing said base for said mounting tool.

3. A mounting clip for securing an independent element relatively to an orificed mounting plate comprising a sheet metal body bent upon itself to form complementary spaced apart gripping components having a receiving channel therebetween for said mounting plate to be gripped by said components, said body having means for engaging and holding an independent element relatively to said mounting plate including means for spacing one of said components from said mounting member and against movement towards the latter thereby forming a receiving space therebetween for said independent element, one of said components having a projecting element projecting into said receiving channel and engageable in the orifice of said mounting plate for locking said body thereon, the other component having an orifice substantially in registry with said projecting element on the other component but offset in respect thereto in a direction towards the bend in said body and forming means for locating said body on said mounting member and said projecting element in locking engagement with a peripheral edge of said orifice in said mounting member, said projecting element forming a base for a locating tool passed through said orifice of said other component.

4. A mounting clip for fastening spring finger units to draper canvas for combine draper pick-ups, including an orificed mounting member secured to said canvas, said finger units having coiled portions and an intervening projecting tongue, comprising a sheet metal body bent upon itself to form a complementary pair of spaced apart gripping components having a receiving channel therebetween for said mounting member to be gripped by said components, one of said components having a projecting element, projecting into said receiving channel for entering an orifice in the mounting member and locking said body thereon, the second of said components having means for spacing it from said mounting member and maintaining it against movement towards the latter as to form a receiving space therebetween for said intervening tongue of said spring finger unit, said second component also having a pair of opposed arms projecting laterally therefrom for receiving the coils of said spring finger unit, said second component having an orifice substantially in registry with said projecting element of the first defined component but offset in respect thereto in a direction towards the bend in said body and forming means for locating said body on said mounting member and said projecting element in locking engagement therewith, said projecting element forming the base for a locating tool passed through said orifice of said other component.

References Cited in the file of this patent

UNITED STATES PATENTS

| | | |
|---|---|---|
| 2,133,837 | Wiley | Oct. 18, 1938 |
| 2,364,303 | Martin | Dec. 5, 1944 |
| 2,542,883 | Tinnerman | Feb. 20, 1951 |
| 2,581,481 | Hartman | Jan. 8, 1952 |